Dec. 28, 1965     I. GOLDBERG     3,226,145
RESILIENT COVERED BUMPER GUARD
Filed May 28, 1964
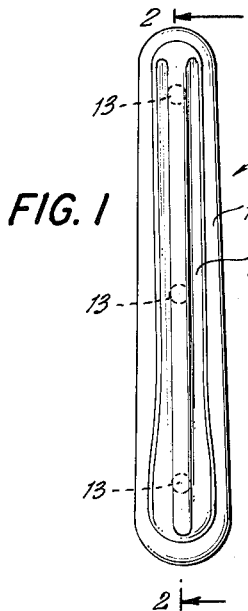
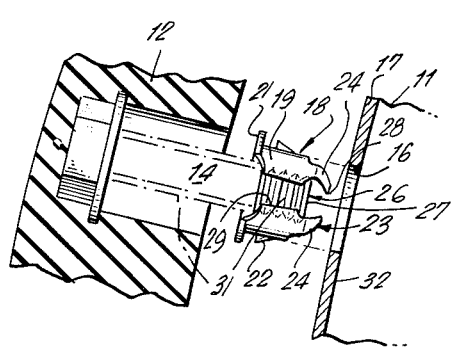
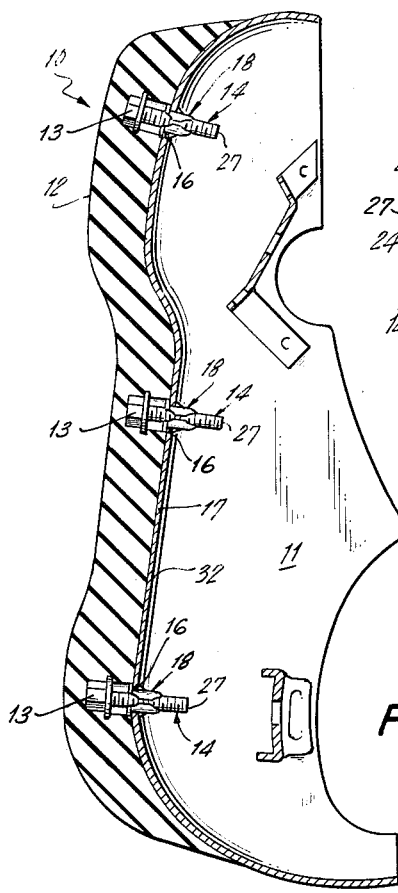
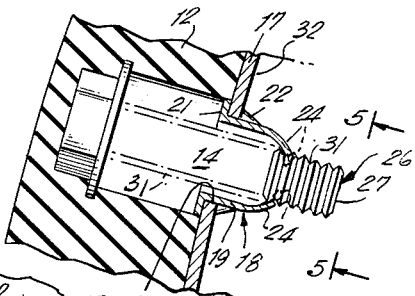
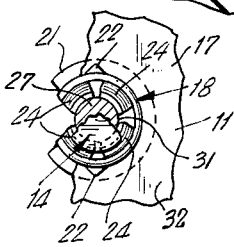
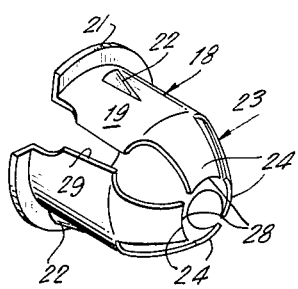
INVENTOR.
IRA GOLDBERG
BY *Amster & Rothstein*
ATTORNEYS 3,226,145
RESILIENT COVERED BUMPER GUARD
Ira Goldberg, New York, N.Y., assignor to East Coast
Auto Specialties Co., New York, N.Y.
Filed May 28, 1964, Ser. No. 370,964
3 Claims. (Cl. 293—65)

The present invention relates to a vehicle bumper guard, and more particularly to a vehicle bumper guard having a protective elastomeric shock absorber member mounted thereon.

An object of the present invention is to provide a combined bumper guard and shock absorber which is easily assembled and yet difficult to disassemble.

Another object of the present invention is to provide an improved fastening device for firmly securing the shock absorber to the bumper guard during the mounting of the former on the latter.

The present invention includes in its scope a combined metallic bumper guard and elastomeric shock absorber, the latter being of the type having spaced extending mounting bolts formed integral thereon which in the mounting operation are adapted to be driven through aligned mounting apertures provided in the bumper guard. In accordance with the teachings of the present invention, an improved mounting fastening device, which more particularly functions as and may be classified as a spring, is fitted on the end of each mounting bolt prior to assembly of the bumper guard and shock absorber and is thus automatically seated in each mounting aperture by movement of the mounting bolt therethrough. Once seated in the mounting aperture, the mounting fastening device or spring functions to prevent accidental disengagement of the shock absorber from the bumper guard.

The invention will be better understood when considered in connection with the accompanying specification and drawings forming a part thereof, in which:

FIG. 1 is a front view of the assembled bumper guard of the present invention;

FIG. 2 is a side view projected from FIG. 1 and in cross section taken along lines 2—2 of FIG. 1;

FIGS. 3 and 4 are fragmentary views, in cross section, more particularly illustrating the role of the fastening device of the present invention during mounting of the shock absorber on the bumper guard;

FIG. 5 is an elevational view, in section, taken on line 5—5 of FIG. 4; and

FIG. 6 is an isolated, isometric view of the fastening device.

As best shown in FIGS. 1 and 2, the completed vehicle bumper guard 10 of the present invention consists of a metallic bumper guard 11 and an elastomeric shock absorber member 12 mounted at spaced points 13 to said bumper guard 11. The elastomeric shock absorber member 12 will be understood to be of conventional construction and of the type having threaded members 14 molded integral therewith and extending from one side of the member. The bumper guard 11 is provided with drilled holes or apertures 16 in its front wall 17 in alignment with and adapted to receive the threaded members 14 during the mounting of the shock absorber member 12 on the bumper guard 11.

However, unlike prior art techniques which utilize conventional nuts adapted to be threadably engaged on the extending ends of the threaded members and relying upon the tightening thereof to firmly secure the shock absorber 12 to the bumper guard 11, the present invention contemplates the use of an improved fastening device, now to be described with particular reference to FIG 6, for automatically securing the shock absorber to the bumper guard during the mounting of the former on the latter. That is, the mounting attachment of the shock absorber 12 on the bumper guard 11 is accomplished without the use of threadable members cooperating with the shock absorber threaded members 14 and thus without the additional tightening operation now required with prior art bumper guards.

As best shown in FIG. 6, the fastening device of the present invention, more particularly designated 18, is a metallic mounting spring having a generally hollow, tubular body 19. A retaining collar 21 is formed on one end of the body 12 and spaced therefrom a distance which approximately equals the thickness of the bumper guard front wall 17 are stop projections 22 spaced circumferentially about the mounting spring body 19. Formed on the opposite end of the body 19 is a generally conical shaped flange 23 consisting of circumferentially spaced inwardly projecting fingers 24.

As best shown in FIG. 3, prior to the mounting of the shock absorber member 12 on the bumper guard 11 a fastening device or mounting spring 18 is fitted on the free end 26 of each threaded member 14, and it will be particularly noted that the projecting fingers 24 of the conical flange 23 extend in part over the end face 27 of said threaded member. When so disposed on the end of the threaded member 14, the mounting spring 18 is automatically seated in the bumper guard mounting aperture 16 by passage of the threaded member 14 through said aperture 16. More particularly, the mounting spring 18 is forced through the aperture 16 by the movement of the threaded member 14 until the retaining collar 21 thereon which extends beyond the periphery of the mounting aperture 16 engages with the front wall 17 of the bumper guard 11. Thereafter, continued movement of the threaded member 14, as occurs in the mounting of the shock absorber 12 on the bumper guard 11, will cause a circumferential expansion in the mounting spring body 19 as the threaded member 14 is forced through the end opening 28 of the conical flange 23. A longitudinal slot 29 is provided in the spring body 19 to allow for this circumferential expansion. As will be best seen in FIG. 4, the expanded mounting spring 18 will thus automatically be seated in the mounting aperture 16 with its retaining collar 21 and stop projections 22 located on opposite sides of the bumper guard front wall 17, and with the fingers 24 of the conical flange 23 in engagement with a thread 31 of the threaded member 14. From what has been described, it will therefore be appreciated that once mounted on the bumper guard 11 the shock absorber member 12 is prevented from disengaging therefrom by the conical flange 23 which holds the threaded member 14 and by the stop projections 22 in abutment against the rear face 32 of the bumper guard front wall 17 which holds the threaded member 14 and fastening device 18 assembly securely in place in a bumper guard mounting aperture 16.

In addition to eliminating any need to place and tighten nuts on the mounting threaded members 14 in the difficult to reach underside confines of the bumper guard 11, an obvious additional advantageous feature of the fastening device 18 of the present invention is the ease in which it readily lends itself to the mounting operation. That is, it is easily fitted on the free ends 26 of the mounting threaded members 14 and is automatically placed in operative condition upon the driving of the threaded members 14 through the mounting apertures 16 during the mounting of the shock absorber 12 on the bumper guard 11.

It will be understood that the invention is not to be limited to the specific construction or arrangement of parts shown, but that they may be widely modified within the invention defined by the claims.

What is claimed is:

1. The combination of a bumper guard, an elastomeric shock absorber mounted on said bumper guard, and connecting means for firmly securing said shock absorber in said mounted position on said bumper guard: said elastomeric shock absorber having plural threaded mounting members formed integral therewith and extending from one side thereof; said bumper guard having openings for receiving said threaded mounting members therethrough for mounting said shock absorber thereon; and said connecting means comprising a plurality of radially contractible mounting members which are each positioned in one of said bumper guard openings, each said mounting member being of a springy split tubular construction and being radially contractible in circumference for insertion into its corresponding bumper guard opening, each said mounting member when in position within a bumper guard opening having circumferentially spaced gripping means thereon in a contracted position within a thread of a threadable member to prevent the disassembly of said shock absorber from said bumper guard and having stop projections extendings radially beyond the periphery of said bumper guard opening on the underside surface of said bumper guard, said stop projections being firmly seated against said underside surface of said bumper guard under the urgency of expansion of said elastomeric shock absorber to prevent rattling of said threaded members and cooperating mounting members within said bumper guard openings.

2. A construction for a radially contractible mounting member as defined in claim 1 including a substantially tubular body fabricated of a spring metal and having an axial slot therein such that radial contraction thereof is possible to the extent of the width of said axial slot.

3. A construction for a radially contractible mounting member as defined in claim 1 including a substantially tubular open-ended body, and wherein said circumferentially spaced gripping means comprising a plurality of fingers formed about one of said end openings of said tubular body.

References Cited by the Examiner

UNITED STATES PATENTS

| 1,613,077 | 1/1927 | Bourgon | 244—42.39 |
| 1,978,935 | 10/1934 | Douglas | 85—80 |
| 2,118,746 | 5/1938 | Tinnerman | 161—53 |
| 2,255,650 | 9/1941 | Burke | 151—41.75 X |
| 2,539,172 | 1/1951 | Andrews | 248—27 |
| 2,858,159 | 10/1958 | Borah | 293—71 |
| 2,993,722 | 7/1961 | Borah | 293—71 |

ARTHUR L. LA POINT, *Primary Examiner.*

H. BELTRAN, *Assistant Examiner.*